(12) United States Patent
Zheng

(10) Patent No.: US 8,425,819 B2
(45) Date of Patent: Apr. 23, 2013

(54) CULTURE MEDIUM FOR CUTTING AND METHOD FOR PRODUCING THE SAME

(76) Inventor: Yongping Zheng, Hangzhou (CN)

( * ) Notice: Subject to any disclaimer, the term of this patent is extended or adjusted under 35 U.S.C. 154(b) by 0 days.

(21) Appl. No.: 12/634,721

(22) Filed: Dec. 10, 2009

(65) Prior Publication Data

US 2011/0302974 A1 Dec. 15, 2011

(30) Foreign Application Priority Data

Dec. 11, 2008 (CN) .......................... 2008 1 0162829

(51) Int. Cl.
  *B29C 47/00* (2006.01)
  *C05F 11/02* (2006.01)
  *C05D 9/02* (2006.01)

(52) U.S. Cl.
  USPC ................. 264/148; 71/24; 71/63; 71/64.13

(58) Field of Classification Search ................. 71/11–26, 71/63, 64.13; 264/148
  See application file for complete search history.

(56) References Cited

U.S. PATENT DOCUMENTS

| | | | | |
|---|---|---|---|---|
| 3,973,355 A * | 8/1976 | McKenzie | ..................... | 47/59 R |
| 4,067,716 A * | 1/1978 | Sterrett | ............................. | 71/24 |
| 4,074,997 A * | 2/1978 | Cohen | ................................. | 71/24 |
| 4,767,440 A * | 8/1988 | Salac | .................................. | 71/23 |
| 4,900,348 A * | 2/1990 | Hoitink | ................................ | 71/6 |
| 5,106,405 A * | 4/1992 | Goto | ..................................... | 71/7 |
| 5,435,821 A * | 7/1995 | Duvdevani et al. | ............... | 71/28 |
| 5,833,733 A * | 11/1998 | Wada et al. | ........................ | 71/27 |
| 6,074,988 A * | 6/2000 | King et al. | ..................... | 504/187 |
| 6,615,539 B1 * | 9/2003 | Obonai et al. | ................. | 47/62 N |
| 2003/0089152 A1 * | 5/2003 | Yelanich et al. | .................. | 71/23 |
| 2003/0141245 A1 * | 7/2003 | Fetterman et al. | ............. | 210/609 |
| 2007/0163316 A1 * | 7/2007 | Fedkenheuer et al. | ............ | 71/11 |
| 2008/0287295 A1 * | 11/2008 | Rubin | ........................... | 504/100 |

* cited by examiner

*Primary Examiner* — Wayne Langel
(74) *Attorney, Agent, or Firm* — Matthias Scholl P.C.; Matthias Scholl

(57) ABSTRACT

A cutting cultivation medium, containing at least: the following components in the following volume percentages: pine scales 20-50%, vermiculite 10-40%, peat 15-40%, and perlite 10-30%, 300-700 g trace elements per cubic meter of cultivation medium being added. A preparation method for a cutting cultivation medium containing at least the following steps: mixing components and trace elements and molding them into a rod-shaped cultivation medium covered by a reticular fiber having a diameter between 4-7 cm, and cutting it into a cylinder body with a length of 5-7 cm and thus a final product is obtained. The cutting cultivation medium provides a good medium environment for cutting cultivation of plants, significantly reduces cultivation time of cutting seedlings, extends wilting time of seedlings after nursery, and provides longer transportation time and a higher survival rate for transplanting of the cutting seedlings.

22 Claims, No Drawings

CULTURE MEDIUM FOR CUTTING AND METHOD FOR PRODUCING THE SAME

CROSS-REFERENCE TO RELATED APPLICATIONS

Pursuant to 35 U.S.C. §119 and the Paris Convention Treaty, this application claims the benefit of Chinese Patent Application No. 200810162829.6 filed on Dec. 11, 2008, the contents of which are incorporated herein by reference.

BACKGROUND OF THE INVENTION

1. Field of the Invention

This invention relate to a culture medium and a preparation method thereof, and particularly to a cutting cultivation medium and a preparation method thereof.

2. Description of the Related Art

A cutting propagation method is the most popular cultivation method in a fast vegetative propagation technique of plants. Most plants, especially woody plants, use a cutting method to facilitate large scale, fast, and low-cost propagation, and thus providing a large number of plant seedlings for the market. In the cutting propagation method, a medium significantly affects cultivation time in nursery and survival time after nursery of cutting seedlings.

However, a conventional cutting propagation method uses a loosen mixture disposed in an aperture disk and composed of one or more materials as a medium, and then cuttings are inserted in the medium for cultivation. Since the medium is loosen and an aperture of the aperture disk is very small, as some roots grow from the cuttings, they cannot be transplanted timely after nursery since they are not combined (intertwisted) with the medium. If the seedling is pulled out from the aperture disk, a root of the seedling will lose wrapping of the medium, and lose water and ingredients. In this condition, new roots exposed in the air will grow old and lose activity soon, and the whole seedling will wilt due to dewatering. Therefore, for a normal cutting cultivation method, nursery time of the cutting seedling is extended so that more roots grow, and roots in the aperture of the aperture disk are intertwisted with the medium by cutting the roots so that exposal roots occurred during nursery are reduced. Although this method reduces some of the exposal roots, it cannot eliminate the whole exposal roots. More importantly, this method extends a nursery time of the seeding and sacrifices best transplanting time thereof. Cutting seedlings produced by the method feature long cultivation time, high cost, damaged roots during nursery, short survival time after nursery and before transplanting, and a long rejuvenation period of more than one week.

SUMMARY OF THE INVENTION

In view of the above-described problem, it is one objective of the invention to provide a cutting cultivation medium and a preparation method thereof to overcome disadvantages in the prior art.

To achieve the above objective, in accordance with one embodiment of the invention, provided is a cutting cultivation medium, comprising components in the following volume percentage: pine scales 20-50%, vermiculite 10-40%, peat 15-40%, and perlite 10-30%, 300-700 g trace elements per cubic meter of cultivation medium being added, and the trace elements being mixed by components in the following weight percentage: calcium sulfate 9-11%, magnesium sulfate 19-21%, manganese sulfate 9.5-11.5%, zinc sulfate 3.8-5.4%, copper sulfate 1.2-2.8%, ferrous sulfate 48.5-56.5%, boric acid 0.2-0.9%, and ammonium molybdenum 0.05-0.15%.

In a class of this embodiment, volume percentage of the components is: pine scales 25-40%, vermiculite 15-35%, peat 25-30%, and perlite 12-25%.

In a class of this embodiment, volume percentage of the components is: pine scales 30-40% (preferably 35%), vermiculite 20-30% (preferably 20%), peat 20-28% (preferably 25%), and perlite 18-25% (preferably 20%).

In a class of this embodiment, trace elements per cubic meter of cultivation medium that is added are 400-600 g (preferably 500 g), components forming the trace elements are in the following weight percentage: calcium sulfate 9.5-10.5% (preferably 10%), magnesium sulfate 19.5-20.5% (preferably 20.3%), manganese sulfate 9.8-10.5% (preferably 10.2%), zinc sulfate 4.0-4.8% (preferably 4.4%), copper sulfate 1.5-2.5% (preferably 2.0%), ferrous sulfate 50.5-54.5% (preferably 52.4%), boric acid 0.5-0.7% (preferably 0.6%), and ammonium molybdenum 0.08-0.12% (preferably 0.1%).

In accordance with another embodiment of the invention, provided is a method for preparing a cutting cultivation medium, comprising steps of 1) mixing: mixing components in the following volume percentage: pine scales 20-50%, vermiculite 10-40%, peat 15-40%, perlite 10-30%, and adding 300-700 g trace elements per cubic meter of cultivation medium, the trace elements being mixed by components in the following weight percentage: calcium sulfate 9-11%, magnesium sulfate 19-21%, manganese sulfate 9.5-11.5%, zinc sulfate 3.8-5.4%, copper sulfate 1.2-2.8%, ferrous sulfate 48.5-56.5%, boric acid 0.2-0.9%, and ammonium molybdenum 0.05-0.15%;

2) Molding: putting mixture in step 1) into a tubular body formed by pervious and breathable reticular fiber, whereby obtaining a rod-shaped cultivation medium with a diameter of 4-7 cm.

3) Cutting: cutting the rod-shaped cultivation medium into a cylinder body with a length of 5-7 cm whereby obtaining a final product.

In a class of this embodiment, volume percentage of the components is: pine scales 25-40%, vermiculite 15-35%, peat 25-30%, and perlite 12-25%.

In a class of this embodiment, volume percentage of the components is: pine scales 30-40% (preferably 35%), vermiculite 20-30% (preferably 20%), peat 20-28% (preferably 25%), and perlite 18-25% (preferably 20%).

In a class of this embodiment, trace elements per cubic meter of cultivation medium that is added are 400-600 g (preferably 500 g), components forming the trace elements are in the following weight percentage: calcium sulfate 9.5-10.5% (preferably 10%), magnesium sulfate 19.5-20.5% (preferably 20.3%), manganese sulfate 9.8-10.5% (preferably 10.2%), zinc sulfate 4.0-4.8% (preferably 4.4%), copper sulfate 1.5-2.5% (preferably 2.0%), ferrous sulfate 50.5-54.5% (preferably 52.4%), boric acid 0.5-0.7% (preferably 0.6%), and ammonium molybdenum 0.08-0.12% (preferably 0.1%).

In a class of this embodiment, the pine scales are pine bark with a particle size of 2-5 mm. the vermiculite is high-temperature-expanded vermiculite with a particle size of 3-5 mm. the peat is produced in northeast China. The perlite is high-temperature-expanded perlite with a particle size of 2-4 mm.

In a class of this embodiment, a diameter of the rod-shaped cultivation medium in step 2) is 4.5-6 cm (preferably 5 cm), a length of the cylinder body in step 3) is 5.5-6.5 cm (preferably 6 cm).

The cutting cultivation medium and the preparation method thereof feature reasonable proportion of raw materials and a unique product form, and provide a better medium environment for cutting cultivation of plants. Using components and percentage of the invention, and the cutting cultivation medium made by the preparation method of the invention for cutting and cultivating plants, cuttings easily root, and no bare root occurs during nursery of cutting seedlings, which significantly reduces cultivation time of the cutting seedlings from cutting to nursery. After nursery, the medium always wraps the roots, which ensures growing environment of the seedlings does not vary, and significantly extends wilting time of nursery stocks, and provides a longer transportation time and a higher survival rate for transportation of the cutting seedlings. The method is convenient and features low production cost.

DETAILED DESCRIPTION OF THE EMBODIMENTS

Further explanation will be given below in conjunction with specific embodiments:

Embodiment 1

200 liters of pine scales, 400 liters of vermiculite, and 250 liters of peat are added to a 3000-liter mixing barrel; and then 150 liters of perlite, 50 grams of calcium sulfate, 101 grams of magnesium sulfate, 51 grams of manganese sulfate, 22 grams of zinc sulfate, 10 grams of copper sulfate, 262 grams of ferrous sulfate, 3 grams of boric acid, and 0.5 grams of ammonium molybdenum are fully mixed and added to the 300-liter mixing barrel with pine scales, vermiculite and peat for mixing. After all component are uniformly mixed, the mixture is made into a sausage-shaped mesh bag with a diameter of 4 cm via a mesh bag machine, and then cut into cylinder bodies, namely final products, each with a length of 5 cm via a cutting machine.

TABLE 1

Test results of reducing the minimum nursery time of cutting seedlings in Embodiment 1

| | Treatment | | | |
|---|---|---|---|---|
| | Cultivation time (d) from cutting to transplanting | | Reduced time | |
| | Plug cuttings | Cutting using the invention | (D) | % |
| Photinia glabra | 100 | 70 | 35 | 35 |
| Ligustrum japonicum | 95 | 65 | 30 | 32 |
| Pyracantha fortuneana | 90 | 60 | 30 | 33 |
| Cranberry-bush vibumum | 100 | 65 | 35 | 35 |

Table 1 indicates that a cutting cultivation medium made by the components, the percentage in embodiment 1 significantly reduces nursery time of *photinia glabra, ligustrum japonicum, pyracantha fortuneana*, and proves that embodiment 1 significantly promotes reduction of a cultivation period of taproot and fibrous root plants.

TABLE 2

Test results of increasing survival time of cutting seedlings that are not transplanted after nursery in embodiment 1

| | Treatment | | | |
|---|---|---|---|---|
| | Time from nursery to wilting | | Extended survival time | |
| | Using cuttings of | | | |
| | Plug cuttings | the invention | (D) | % |
| Treatment before nursery | Seedlings are fully poured 12 hours before nursery | | | |
| Packaging | Nursery stocks are in a unit of 50 strains, plastic bags are used to cover the roots, then the nursery stocks are put in a box made of corrugated paper, and a sealing tape is used to seal the box. | Nursery stocks are uniformly distributed in the box in a tip-to-tip manner, and a sealing tape is used to seal the box. | | |
| Photinia glabra | 1 | 7 | 6 | 600 |
| Ligustrum japonicum | 2 | 10 | 8 | 400 |
| Pyracantha fortuneana | 0.5 | 5 | 4.5 | 900 |
| Cranberry-bush vibumum | 1.5 | 7 | 5.5 | 360 |
| Description | In autumn, no water compensation is required for seedlings after nursery, and survival time means that above 50% tested seedlings do not wilt. | | | |

Table 2 indicates that embodiment 1 significantly increases survival time of cutting seedlings of *photinia glabra, ligustrum japonicum, pyracantha fortuneana* that are not transplanted after nursery.

Embodiment 2

350 liters of pine scales, 200 liters of vermiculite, and 150 liters of peat are added to a 3000-liter mixing barrel; and then 300 liters of perlite, 50 grams of calcium sulfate, 101 grams of magnesium sulfate, 51 grams of manganese sulfate, 22 grams of zinc sulfate, 10 grams of copper sulfate, 262 grams of ferrous sulfate, 3 grams of boric acid, 0.5 grams of ammonium molybdenum are fully mixed and added to the 300-liter mixing barrel with pine scales, vermiculite and peat. After all component are uniformly mixed, the mixture is made into a sausage-shaped cutting mesh bag with a diameter of 6 cm and a length above 10 m via a mesh bag machine, and then cut into multiple cylinder bodies, namely final products, each with a length of 7 cm via a cutting machine.

Technical effect of the above-mentioned cultivation medium is illustrated by a test as follows.

TABLE 3

Test results of reducing cultivation time of different seedlings in embodiment 2

| | Treatment | | | |
|---|---|---|---|---|
| | Cultivation time from cutting to nursery | | | |
| | Plug cutting is used, and then transplanted to a 0.5 gallons of nutritional bowl until nursery stocks are formed | Nursery stocks cultivated by the invention | Reduced cultivation time (D) | % |
| *Photinia glabra* | 220 | 175 | 45 | 20 |
| *Ligustrum japonicum* | 215 | 175 | 40 | 17 |
| *Pyracantha fortuneana* | 220 | 170 | 55 | 25 |
| Cranberry-bush *viburnum* | 210 | 175 | 35 | 17 |

Table 3 indicates that a cutting cultivation medium made by the components, the percentage in embodiment 2 significantly reduces nursery time of *photinia glabra, ligustrum japonicum, pyracantha fortuneana*, and proves that embodiment 2 significantly promotes reduction of cultivation period of taproot and fibrous root plants.

Embodiment 3

450 liters of pine scales, 100 liters of vermiculite, and 350 liters of peat are added to a 3000-liter mixing barrel; and then 100 liters of perlite, 50 grams of calcium sulfate, 101 grams of magnesium sulfate, 51 grams of manganese sulfate, 22 grams of zinc sulfate, 10 grams of copper sulfate, 262 grams of ferrous sulfate, 3 grams of boric acid, 0.5 grams of ammonium molybdenum are fully mixed and added to the 300-liter mixing barrel with pine scales, vermiculite and peat. After all component are uniformly mixed, the mixture is made into a sausage-shaped mesh bag with a diameter of 6 cm and a length above 10 m via a mesh bag machine, and then cut into multiple cylinder bodies, namely final products, each with a length of 7 cm via a cutting machine.

The test indicates that the cutting cultivation medium made by the components, the percentage and the preparation method in embodiment 3 significantly reduces nursery time of *photinia glabra, ligustrum japonicum, pyracantha fortuneana*, significantly increases survival time of cutting seedlings that are not transplanted after nursery, and significantly promotes reduction of cultivation period of taproot and fibrous root plants.

In the above-mentioned embodiments, the trace elements that are added per cubic meter of cultivation medium are selected in a range of 300-700 g, for example, 300 g, 400 g, 550 g, 700 g, in which trace elements are weighted and mixed according to the following weight percentage: calcium sulfate 9-11%, magnesium sulfate 19-21%, manganese sulfate 9.5-11.5%, 3.8-5.4% zinc sulfate, copper sulfate 1.2-2.8%, 48.5-56.5% of ferrous sulfate, boric acid 0.2-0.9%, and ammonium molybdenum 0.05-0.15%, and then nursery time of *photinia glabra, ligustrum japonicum*, and *pyracantha fortuneana*, as well as survival time of the cutting seedlings that are not transplanted after nursery are tested, and the same results as above can be obtained.

Chemical formula of components of the trace elements of the invention is as follows:

TABLE 4

Chemical formula of components of the trace elements in the invention

| Material name | | Formula |
|---|---|---|
| Calcium sulfate | CALCIUM SULFATE | $CaSO_4 \cdot 2H_2O$ |
| Magnesium Sulfate | MAGNESIUM SULFATE | $MgSO_4 \cdot 7H_2O$ |
| Manganese Sulfate | MANGANESE SULFATE | $MnSO_4 \cdot 4H_2O$ |
| Zinc Sulfate | ZINC SULFATE | $ZnSO_4 \cdot 7H_2O$ |
| Copper sulfate | COPPER SULFATE | $CuSO_4 \cdot 5H_2O$ |
| Ferrous sulfate | FERROUS SULFATE | $FeSO_4 \cdot 7H_2O$ |
| Boric acid | BORIC ACID | $H_3BO_3$ |
| Ammonium molybdenum | AMMONIUM MOLYBDENUM | $(NH_4)_6Mo_7O_{24}$ |

The invention claimed is:

1. A cutting culture medium, comprising the following components in the following volume percentage: pine scales 20-50%, vermiculite 10-40%, peat 15-40%, and perlite 10-30%; wherein:
   said pine scales have a particle size of 2-5 mm;
   said vermiculite has a particle size of 3-5 mm;
   said perlite has a particle size of 2-4 mm; and
   the cutting culture medium comprises 300-700 g trace elements per cubic meter of the cutting medium, said trace elements comprising the following components in the following weight percentage: calcium sulfate 9-11%, magnesium sulfate 19-21%, manganese sulfate 9.5-11.5%, zinc sulfate 3.8-5.4%, copper sulfate 1.2-2.8%, ferrous sulfate 48.5-56.5%, boric acid 0.2-0.9%, and ammonium heptamolybdate 0.05-0.15%.

2. The cutting culture medium of claim 1, wherein volume percentage of said components is: pine scales 25-40%, vermiculite 15-35%, peat 25-30%, and perlite 12-25%.

3. The cutting culture medium of claim 1, wherein volume percentage of said components is: pine scales 30-40%, vermiculite 20-30%, peat 20-28%, and perlite 18-25%.

4. The cutting culture medium of claim 1, wherein volume percentage of said components is: pine scales 35%, vermiculite 20%, peat 25%, and perlite 20%.

5. The cutting culture medium of claim 1, wherein the cutting culture medium comprises 400-600 g of trace elements per cubic meter of the cutting medium, said trace elements comprising the following components in the following weight percentage: calcium sulfate 9.5-10.5%, magnesium sulfate 19.5-20.5%, manganese sulfate 9.8-10.5%, zinc sulfate 4.0-4.8%, copper sulfate 1.5-2.5%, ferrous sulfate 50.5-54.5%, boric acid 0.5-0.7%, and ammonium heptamolybdate 0.08-0.12%.

6. The cutting culture medium of claim 1, wherein the cutting culture medium comprises 500 g of trace elements per cubic meter of the cutting medium, said trace elements comprising the following components in the following weight percentage: 10% calcium sulfate, magnesium sulfate 20.3%, manganese sulfate 10.2%, zinc sulfate 4.4%, copper sulfate 2.0%, ferrous sulfate 52.4%, boric acid 0.6%, and ammonium heptamolybdate 0.1%.

7. A method for preparing a cutting culture medium, comprising steps of:
   1) mixing components in the following volume percentage: pine scales 20-50%, vermiculite 10-40%, peat 15-40%, perlite 10-30%, and adding 300-700 g trace elements per cubic meter of culture medium, said pine scales having a particle size of 2-5 mm, said vermiculite having a particle size of 3-5 mm, said perlite having a particle size of 2-4 mm, said trace elements comprising components in the following weight percentage: calcium sulfate 9-11%, magnesium sulfate 19-21%, manganese sulfate 9.5-11.5%, zinc sulfate 3.8-5.4%, copper sulfate 1.2-2.8%, ferrous sulfate 48.5-56.5%, boric acid 0.2-0.9%, and ammonium heptamolybdate 0.05-0.15%;

2) putting mixture obtained in step 1) into a tubular body having a diameter of 4-7 cm and formed of pervious and breathable reticular fibers to obtain a rod-shaped culture medium with a diameter of 4-7 cm;

3) cutting said rod-shaped culture medium into a cylinder body with a length of 5-7 cm whereby obtaining a final product.

8. The method of claim 7, wherein volume percentage of said components is: pine scales 25-40%, vermiculite 15-35%, peat 25-30%, and perlite 12-25%.

9. The method of claim 7, wherein volume percentage of said components is: pine scales 30-40%, vermiculite 20-30%, peat 20-28%, and perlite 18-25%.

10. The method of claim 7, wherein volume percentage of said components is: pine scales 35%, vermiculite 20%, peat 25%, perlite 20%.

11. The method of claim 7, wherein the concentration of said trace elements in said culture medium is 400-600 g per cubic meter of the culture medium, and the components forming said trace elements are in the following weight percentage: calcium sulfate 9.5-10.5%, magnesium sulfate 19.5-20.5%, manganese sulfate 9.8-10.5%, zinc sulfate 4.0-4.8%, copper sulfate 1.5-2.5%, ferrous sulfate 50.5-54.5%, boric acid 0.5-0.7%, and ammonium heptamolybdate 0.08-0.12%.

12. The method of claim 7, wherein the concentration of said trace elements in said culture medium is 500 g per cubic meter of said culture medium, the components forming said trace elements are in the following weight percentage: 10% calcium sulfate, magnesium sulfate 20.3%, manganese sulfate 10.2%, zinc sulfate 4.4%, copper sulfate 2.0%, ferrous sulfate 52.4%, boric acid 0.6%, and ammonium heptamolybdate 0.1%.

13. The method of claim 7, wherein said pine scales are pine bark.

14. The method of claim 7, wherein said vermiculite is high-temperature-expanded vermiculite.

15. The method of claim 7, wherein said peat is produced in northeast China.

16. The method of claim 7, wherein said perlite is high-temperature-expanded perlite.

17. The method of claim 7, wherein a diameter of said rod-shaped culture medium in step 2) is 4.5-6 cm.

18. The method of claim 7, wherein a diameter of said rod-shaped culture medium in step 2) is 5 cm.

19. The method of claim 7, wherein a length of said cylinder body in step 3) is 5.5-6.5 cm.

20. The method of claim 7, wherein a length of said cylinder body in step 3) is 6 cm.

21. A method of packing the cutting culture medium of claim 1, the method comprising:

1) putting the mixture of the cutting culture medium of claim 1 into a tubular body formed of pervious and breathable reticular fibers and having a diameter of 4-7 cm to obtain a rod-shaped culture medium having a diameter of 4-7 cm; and 2) cutting said rod-shaped culture medium into a cylinder body having a length of 5-7 cm.

22. A cutting culture medium, comprising the following components in the following volume percentage: pine scales 20-50%, vermiculite 10-40%, peat 15-40%, and perlite 10-30%, and 300-700 g trace elements per cubic meter of the culture medium, said trace elements comprising the following components in the following weight percentage: calcium sulfate 9-11%, magnesium sulfate 19-21%, manganese sulfate 9.5-11.5%, zinc sulfate 3.8-5.4%, copper sulfate 1.2-2.8%, ferrous sulfate 48.5-56.5%, boric acid 0.2-0.9%, and ammonium heptamolybdate 0.05-0.15%;

wherein:
said pine scales have a particle size of 2-5 mm;
said vermiculite has a particle size of 3-5 mm;
said perlite has a particle size of 2-4 mm; and
the cutting culture medium is in a tubular body formed of pervious and breathable reticular fibers, and said tubular body has a diameter of 4-7 cm and a length of 5-7 cm.

\* \* \* \* \*